Figure 7:
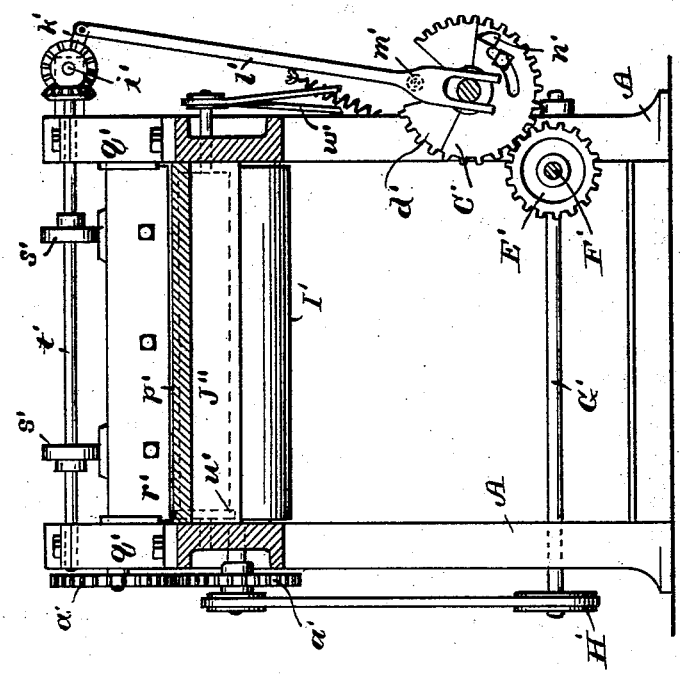

(No Model.) 6 Sheets—Sheet 1.
L. T. & I. P. HALLOCK.
ROUND PAPER BOX MACHINE.
No. 569,496. Patented Oct. 13, 1896.
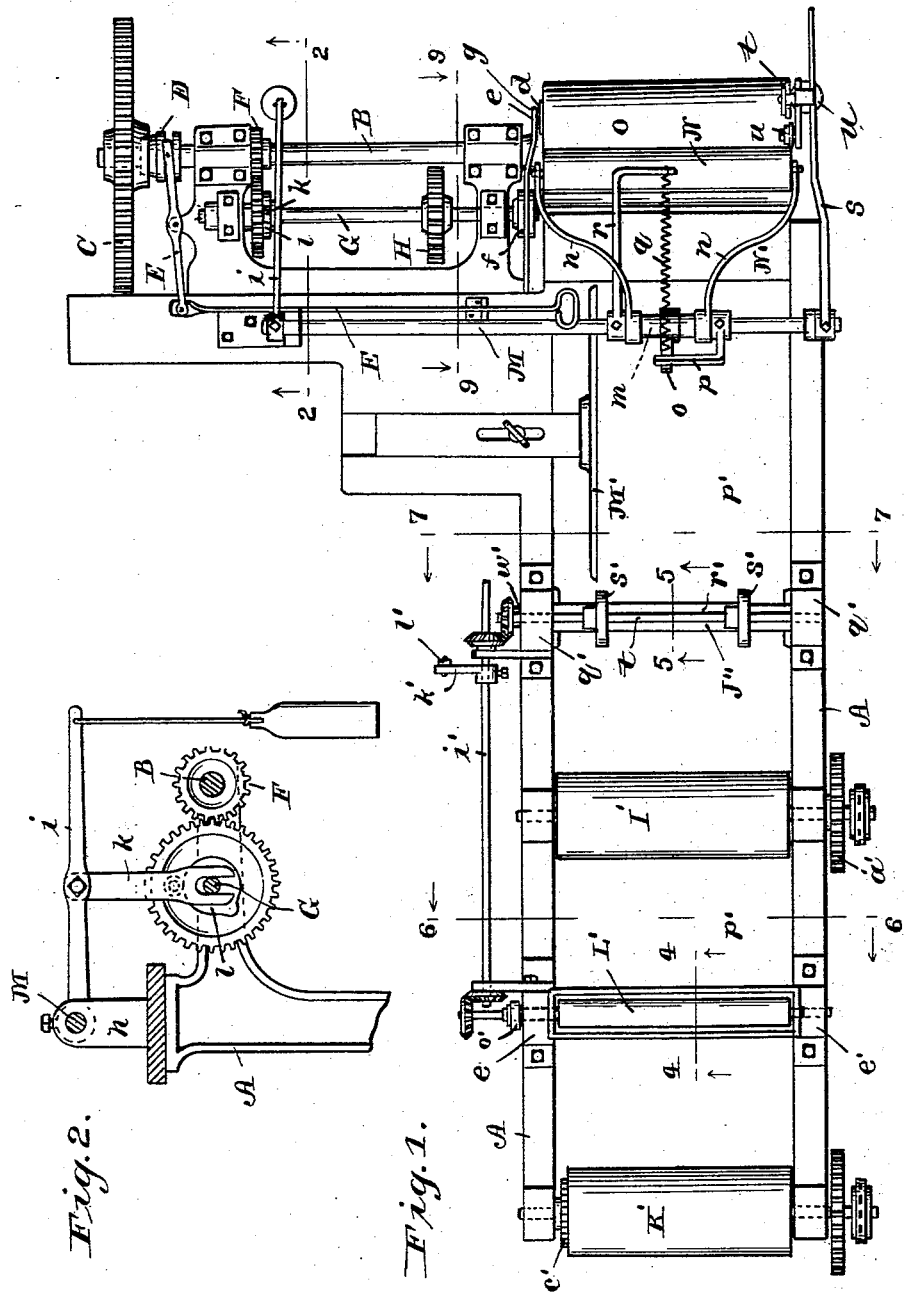
Witnesses
R. H. Newman.
Harriet L. Slason.
Inventors
Lee Thomas Hallock
Ira Parker Hallock
by Chamberlain & Newman Attorneys

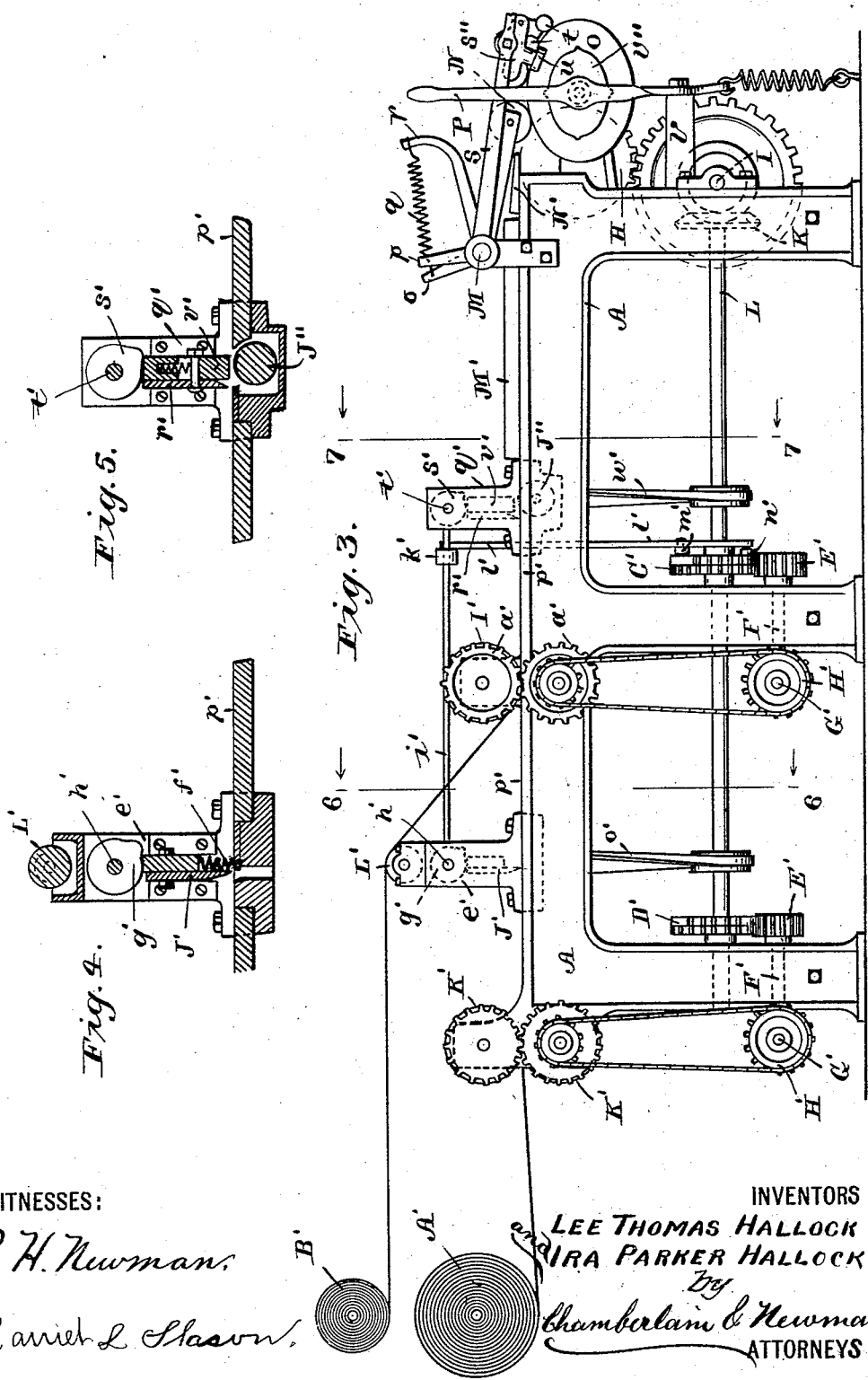

(No Model.) 6 Sheets—Sheet 3.

L. T. & I. P. HALLOCK.
ROUND PAPER BOX MACHINE.

No. 569,496. Patented Oct. 13, 1896.

Witnesses
R. W. Newman
Harriet L. Slason

Inventors
LEE THOMAS HALLOCK
and IRA PARKER HALLOCK
by Chamberlain & Newman Attorneys

THE NORRIS PETERS CO., PHOTO-LITHO., WASHINGTON, D. C.

(No Model.)

L. T. & I. P. HALLOCK.
ROUND PAPER BOX MACHINE.

No. 569,496. Patented Oct. 13, 1896.

Witnesses
R. H. Newman
Harriet L. Slason

Inventors
Lee Thomas Hallock
and Ira Parker Hallock
by
Chamberlain & Newman Attorneys (No Model.) 6 Sheets—Sheet 5.
L. T. & I. P. HALLOCK.
ROUND PAPER BOX MACHINE.
No. 569,496. Patented Oct. 13, 1896.
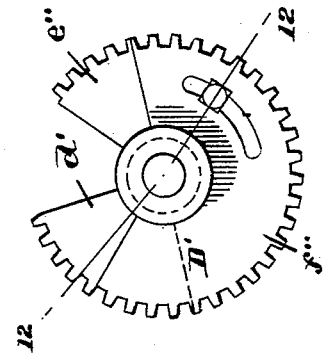
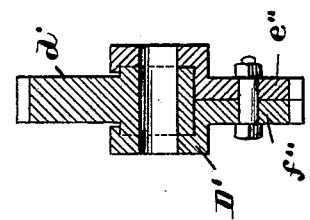
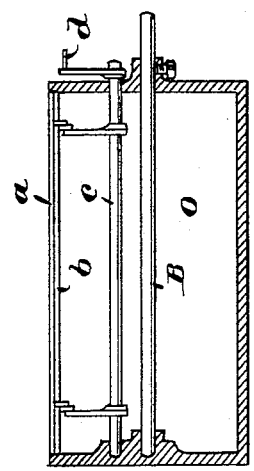
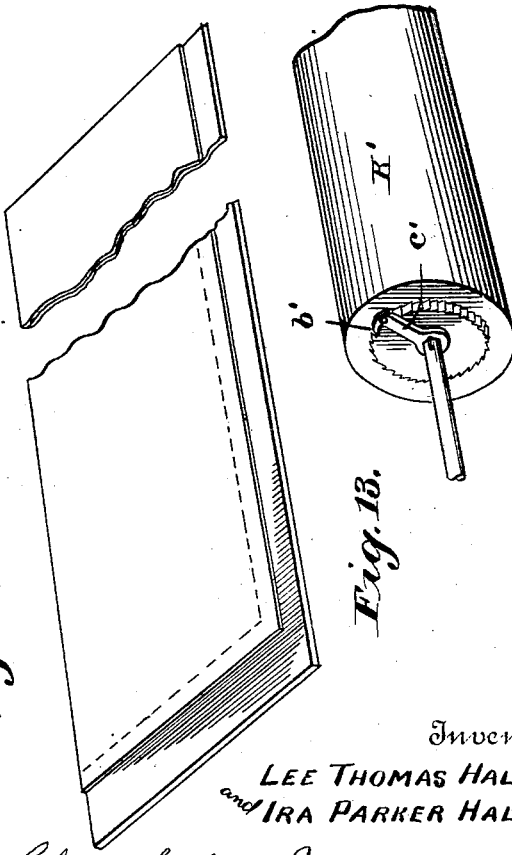
Witnesses
R. H. Newman.
Harriet L. Slason.
Inventors
LEE THOMAS HALLOCK
and IRA PARKER HALLOCK
By Chamberlain & Newman Attorneys
THE NORRIS PETERS CO., PHOTO-LITHO., WASHINGTON, D. C.

(No Model.) L. T. & I. P. HALLOCK. 6 Sheets—Sheet 6.
ROUND PAPER BOX MACHINE.
No. 569,496. Patented Oct. 13, 1896.
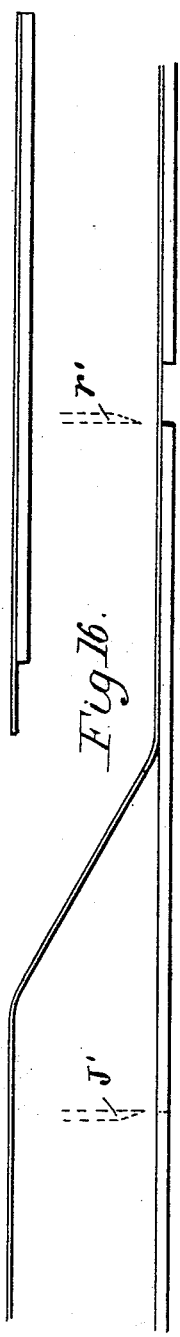
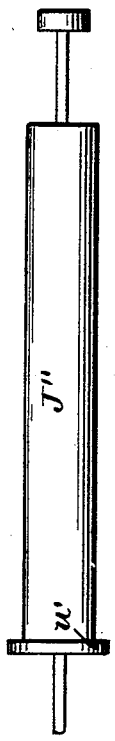
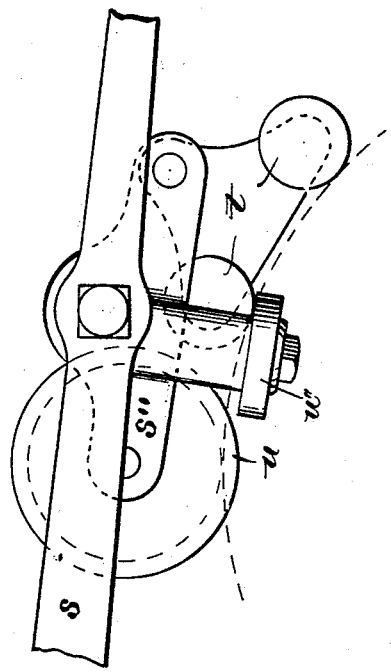
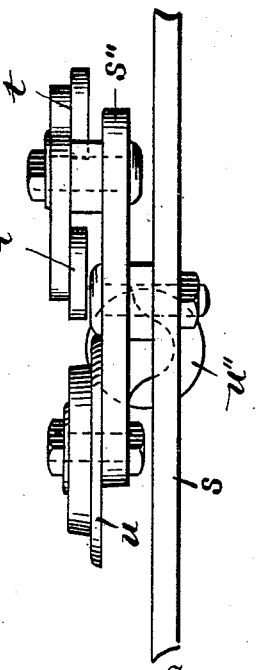
Witnesses
R. H. Newman.
Harriet L. Slason.
Inventors
LEE THOMAS HALLOCK
and IRA PARKER HALLOCK
by Chamberlain & Newman Attorneys

UNITED STATES PATENT OFFICE.

LEE THOMAS HALLOCK, OF DANBURY, CONNECTICUT, AND IRA PARKER HALLOCK, OF YONKERS, NEW YORK.

ROUND-PAPER-BOX MACHINE.

SPECIFICATION forming part of Letters Patent No. 569,496, dated October 13, 1896.

Application filed November 19, 1895. Serial No. 569,451. (No model.)

*To all whom it may concern:*

Be it known that we, LEE THOMAS HALLOCK, of Danbury, Fairfield county, Connecticut, and IRA PARKER HALLOCK, of Yonkers, Westchester county, New York, citizens of the United States, have invented certain new and useful Improvements in Bandbox-Machines, of which the following is a specification.

This invention relates to new and useful improvements in machinery for automatically making bandboxes of strawboard, pasteboard, or like material.

It is the object of our invention to construct an automatic bandbox-machine which will produce finished pasteboard boxes having a thin covering of paper upon the outside, and which machine will be comparatively simple in construction and durable in every essential feature, and, further, to so construct said machine that it will be quick and automatic in its operations.

This machine is designed to automatically take both the pasteboard and the outside paper covering from their respective rolls, which are placed adjacent to the machine. The paper is passed over a suitable glue-roll, from which it is drawn into a pair of compressing-rolls, together with the pasteboard, where the two are firmly united, forming a single strip. This strip is next cut into suitable lengths in such a manner as to have the paper covering of the lengths project over about one inch on one end and a half-inch on one side thereof. Said projecting edges of the paper are glued as the same is carried forward to the forming-drum. The said forming-drum is provided with means for grasping the forward end of the strip, at which instant the oblong bottom is placed in position on the end of the drum and so held. The drum then rotates, coiling the strip thereon, the same being broken over and secured to the bottom. A rotation of the drum completes the laying of the paper thereon, when the projecting glued end of the paper covering will overlap the end of the pasteboard and be glued on the body of the box, thus completing the same.

Upon the accompanying drawings, which form a part of this specification, the same letters of reference denote like or corresponding parts upon the several figures, and of which—

Figure 6:
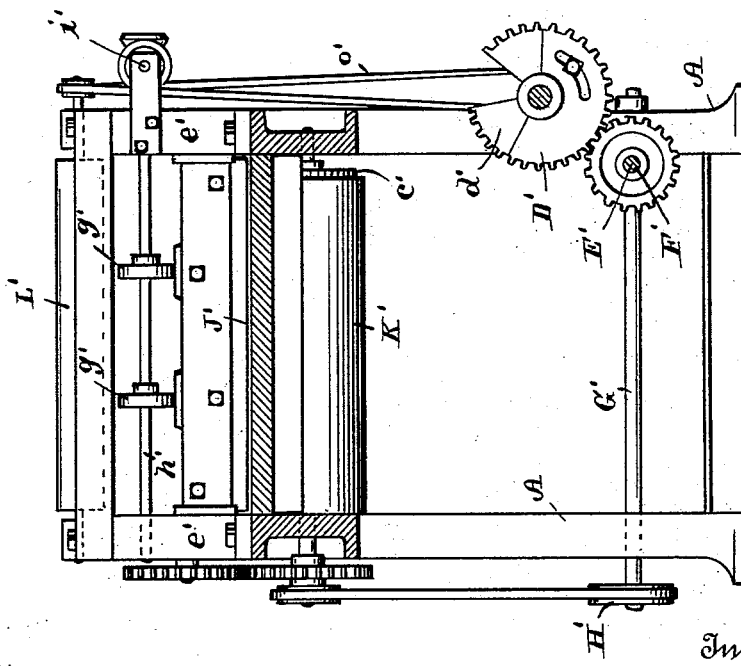
Figure 10:
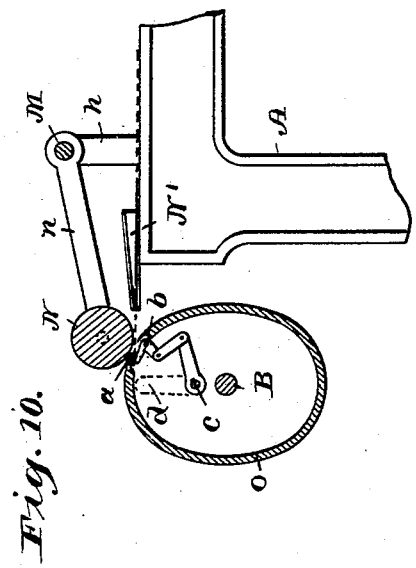
Figure 8:
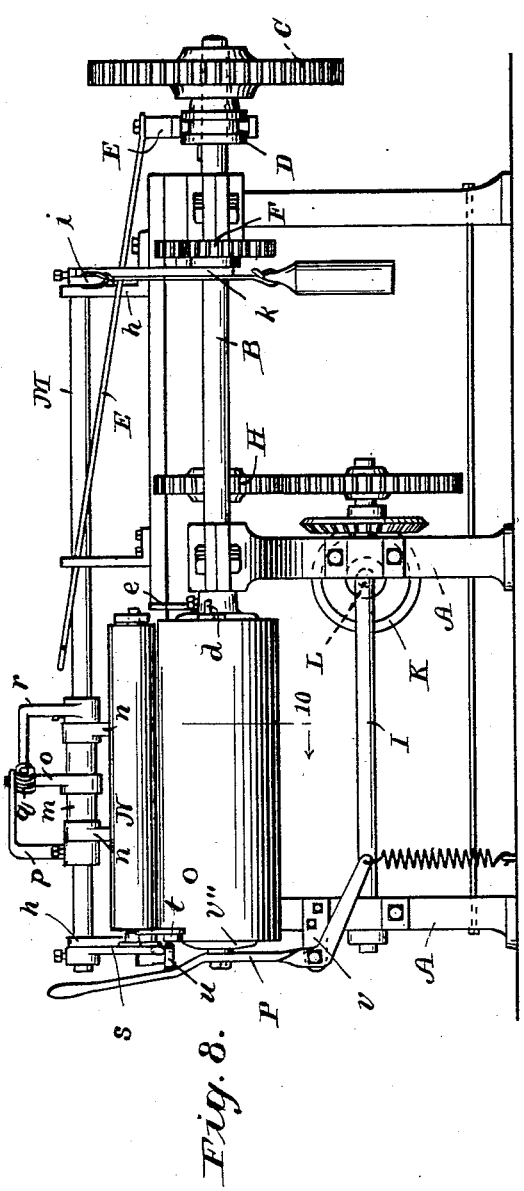
Figure 9:
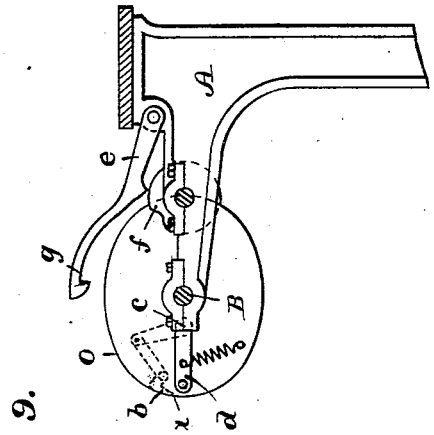

Figure 1 is a plan view of our machine complete. Fig. 2 is an enlarged detail section on line 2 2 of Fig. 1, looking in the direction of arrows. Fig. 3 is a front elevation of our machine complete, the position of the parts corresponding with Fig. 1. Fig. 4 is an enlarged detail cross-section on line 4 4 of Fig. 1, showing the pasteboard-cutting knife and the paper-gluing roll. Fig. 5 is an enlarged detail cross-section on line 5 5 of Fig. 1, showing the severing-knife and the final gumming-roll. Figs. 6 and 7 are cross-sections on lines 6 6 and 7 7, respectively, of Figs. 1 and 3. Fig. 8 is an end elevation as seen from the right in Figs. 1 and 3. Fig. 9 is a detailed sectional elevation on line 9 9 of Fig. 1. Fig. 10 is a cross-section on line 10 of Fig. 8, the drum being in a vertical and starting position. Fig. 11 is a longitudinal central section through the drum. Fig. 12 is an enlarged central vertical cross-section of the adjustable gear D' shown in Fig. 6, said section being taken on line 12 of Fig. 12$^a$. Fig. 12$^a$ is a similarly-enlarged side elevation of said adjustable gear. Fig. 13 is an enlarged detail perspective view of the bottom feed-roll K'. Fig. 14 is a detail perspective view of one end of a strip from which the boxes are formed, the same showing the manner in which the paper overlaps one end and side of the pasteboard. Fig. 15 shows a bottom perspective view of a complete round box, such as is produced on our novel machine. Fig. 15$^a$ is an enlarged detail cross-section of the bottom edge of the box shown in Fig. 15. Fig. 16 shows an enlarged diagram edge view of the manner in which the pasteboard and paper strips are united and the strips severed therefrom. Fig. 16$^a$ shows a similarly-enlarged side elevation of one of the completed lengths of stock from which the box is formed. Fig. 17 is an enlarged detail view of the gumming-roll J'', shown in Figs. 5 and 7. Fig. 18 is an enlarged plan view of the crimping-rolls supported on lever $s$. Fig. 19 is a similarly-enlarged side elevation of the mechanism shown in Fig. 18.

Referring to the letters of reference upon the several figures of the drawings, A indicates the framework, and B the main driving-shaft, which is provided with a suitable driving-wheel C. Adjacent to said driving-wheel and splined to its shaft is a friction-clutch member D for the purpose of engagement with the clutch-face of said driving-wheel. This clutch member D is operated by means of the operating-levers E E, which clearly appear in Figs. 1 and 8. Upon the driving-shaft B we secure a gear-wheel F, which meshes with a similar gear-wheel upon a corresponding horizontal shaft G, which is in like manner journaled in the framework of the machine. The gear H upon the shaft G meshes with a similar gear upon a lower horizontal shaft I, which in turn has upon it a beveled pinion meshing with a like pinion K on horizontal shaft L. Said shaft L serves to drive and operate the feed and cutting mechanism, all of which will be later more fully explained.

The drums upon which the boxes are formed are made in several sizes and are detachably secured to one end of the main shaft B, as will be best understood with reference to Figs. 8 and 11. In order to automatically clamp one end of the strip to the drum to insure the winding of the same thereon, we provide mechanism, which is clearly shown in Figs. 1, 9, 10, and 11, which is as follows: Within the periphery of the drum is a slot $a$, which extends lengthwise therewith, and in which the end of the pasteboard strip is designed to be clamped by means of a pivoted clamp $b$, which is operatively connected with a rock-shaft $c$, running lengthwise within the drum. The rear end of the shaft extends through one end of the drum and has secured thereon a tripping-finger $d$. Said finger is provided with a suitable spring which serves to draw it down, thus keeping the clamp of the drum normally shut. The opening of this device is effected by means of an arm $e$, which is pivoted to the framework, and the free central portion thereof rides upon a cam $f$, secured to the inner end of the horizontal shaft G. Said cam controls the position of the arm in such a manner that when the drum nears the position to receive the stock the lug $g$ upon the end of the arm will engage the finger $d$ of the rock-shaft $c$ in the drum, and by said engagement open the clamp thereof, at which instant the stock is fed therein, and with the advancement of the movement of the machine, and by reason of the cam and the arm $e$ riding thereon, the latter will be raised out of engagement with the before-mentioned finger $d$ upon the rock-shaft of the drum, and by reason of the spring attached to the finger the latter will be retracted to its normal position, thus closing the clamp and retaining the end of the strip therein.

The mechanism for rolling the strip down upon the drum consists as follows, (see Figs. 1, 2, 8, 9, and 10:) we provide a rock-shaft M, which is mounted in standards $h\ h$, and which shaft obtains its movement by means of an arm $i$, secured thereto, and having suspended therefrom a weight which serves to normally hold a roll of the depending fork $k$ upon the face of the cam $l$, which is secured to the before-mentioned rotatable shaft G. A roll N serves to ride upon the drum, and at each complete rotation of the same is raised therefrom for the purpose of removing the finished box. Said rising movement is brought about by the action of the cam $l$, its connection with the rock-shaft M, and other mechanism mounted upon the rock-shaft, consisting of a loose sleeve $m$, having arms $n\ n$ fixed thereto, which serve to support the before-mentioned roll N. Said sleeve is also provided with a third arm $o$, which is adapted to be engaged by an angle-arm $p$, fixed to the rock-shaft M, which engagement will raise said roll as desired.

In order to provide a tension to the roll and retain the same snugly upon the drum for the purpose of pressing the stock smoothly thereon, we attach one end of a spring $q$ to the angle-arm $o$ of the sleeve, and the other end we attach to the arm $r$, fixed to the rock-shaft M. It is obvious that said construction will give the desired results and will not interfere with the mechanism before recited for the raising of the roll from the drum. We also secure to said rock-shaft M a lever $s$, to which is pivoted a block $s''$, carrying crimping-rolls $u\ u''$. The larger one, $u$, of these rolls is provided with a flange, as shown, which extends over upon the bottom of the box, and serves to break the lower glued edge of the side down upon said bottom portion. The other and smaller roll, $u''$, operates against the bottom and upon the broken-over portion of the side and serves to snugly press the latter down against the bottom and stick the edge thereto. The small rolls $t\ t$ operate upon the lower edge of the periphery of the box for the purpose of finally rolling and completing the same. It will thus be apparent that the combined action of all these rolls is for the purpose of breaking over the lower glued edge of the sides of the strip and pressing and sticking the same firmly against the bottom, whereby said sides become fixed thereto and finishes the seam thereof. The bottom for the box is placed in position against the end of the drum by hand and is held in said position by means of a plate $v''$, attached to a spring-actuated lever P, which is pivoted to a bracket $v$, secured to the frame. The function of the spring connected to said lever is to hold the plate $v''$ thereof firmly against the drum during the forming of a box. In order to remove the box and to substitute an additional bottom, the operator would force the lever down out of the path of the drum against the action of its spring and then remove said box by hand.

The mechanism for gluing, preparing, and cutting the stock into lengths is entirely automatic in its action and works in unison with the parts which form the box. Said mechanism is connected with and operated by the longitudinal shaft L. (See Figs. 3, 6, and 7.) As before stated, both the pasteboard body for the box and also the thin paper-covering are taken from continuous rolls A' and B', respectively, the latter being preferably placed above the former, as shown.

Upon the longitudinal shaft L are two adjustable broken gears C' and D', each of which mesh with a smaller gear E' on a short shaft F', having a bevel-pinion thereon. Said pinion meshes with a like pinion on a cross-shaft G', which is provided with a sprocket H', having a chain-belt connection with a similar sprocket upon the shaft of the feed and uniting rolls. The latter rolls I' I' are operatively connected together by means of gears $a'$ $a'$. The same is true of the pasteboard feed-rolls K' K', but the connection by which said rolls are driven differ, in that the shaft and rolls are operatively connected by means of a pawl and ratchet $b'$ and $c'$, respectively, which clearly appears in Fig. 13. The purpose of this construction is to insure the simultaneous rotation of both drums through their shafts and connections with the longitudinal shaft L, journaled below, and at the same time to allow said drums to rotate in advance of their shafts by means of the stock being drawn through, by reason of the action of the adjoining rolls I' I' being rotated faster than the feed-rolls.

The gears C' and D' on shaft L each consist of two broken sections $e''$ and $f''$, secured together by means of a screw, as shown, and in such a manner that the broken-away portion of one section registers with that of the other to a more or less degree, according to their adjusted positions. The hubs of said sections are provided with an internal recess, as shown, and within said recess the hub of the idle segment $d'$ is pivoted. Said portion $d'$ simply serves to swing between the two shoulders of the adjustable parts $e''$ and $f''$ and thus insures the proper engagement of the gear E' with the advancing teeth of said adjustable gear. It will therefore be apparent that the idle movement of said gears may be varied and their functions accordingly changed.

It is obvious that the movement of the stock through the machine is not continuous by reason of the idle portion $d'$ of the adjustable gears C' and D' before mentioned. The stock is fed forward a distance equal to the length of the strip desired, when the same becomes idle and the cutting operation is effected. The pasteboard and paper is cut at the same instant, but with separate knives, as will be seen with reference to the drawings. The operation of cutting the pasteboard is effected by means of the knife J', which is mounted in ways of standards $e'$ $e'$, secured at either side of the machine. Said knife is held in its normal raised position by means of a spring $f''$, fitted under the ends thereof, and it is forced down through the stock by the action of the cams $g'$ $g'$, secured upon a rock-shaft $h'$. Said shaft in turn receives its movement from the shaft $i'$, which bears an arm $k'$, connected to the vertical lever $l'$, having a roll $m'$ for the engagement of the inclined lug $n'$ on the adjustable gear C'. By the connection just described it will be seen that with each rotation of the shaft L and the adjustable gear mounted thereon the stock is fed forward a distance equal to the length of a strip, and then the knives are operated to sever the same.

Upon the standard $e'$ $e'$ is mounted a trough provided with a glue-roll L', over which the paper is drawn, and by means of which the under side thereof is evenly glued, for the purpose of sticking the same to the pasteboard by the action of the rolls I' I'. Said glue-roll is connected to the longitudinal shaft L by means of a pulley thereon and a belt connection $o'$, as seen in Fig. 3. The second and final gluing-roll J'' is mounted slightly below the surface of the bed $p'$ and is provided with a glue-trough in which it rotates. Said glue-roll is rotated by means of a belt connection $w'$ with a pulley of the shaft L. It will thus be apparent that the united completed strip is finally glued upon one edge and end thereof for the purpose of securing their overlapping edges together when the box is formed upon the drum. Adjacent to this gluing-roll and at either side of the bed of the machine are a pair of standards $q'$ $q'$, in which is mounted the paper-severing knife $r'$, which operates by means of cams $s'$ $s'$ on the rock-shaft $t'$, which shaft is operatively connected to the before-mentioned shaft $i'$.

As before stated, the periphery-gluing roll J' is slightly below the surface of the bed, and in consequence the strip is free to pass over it, except at one end of the roll where the same is provided with an enlargement $u'$, (see Fig. 7,) which serves to glue the under side of the overlapping edge of the paper for the attachment of the same to the bottom. The entire length of the roll is only brought into use upon the end of the strip by the action of the gate $v'$, which is secured to the knife by means of screws engaging said knife and passing freely through vertical slots of said gate. A small coiled spring is inserted between said screws and the gate, as shown, (see Fig. 5,) and serves to insure the gate being forced down against the strip slightly in advance of its knife, thus forcing the paper against the gluing-roll just an instant before the strip is severed.

From the final severing-knife and gluing-roll the strip is guided into the recess of the drum by means of the guides M' and N'. The latter guide consists simply of two pieces of sheet metal, retained at a distance apart equal to that of the thickness of the paper, thus allowing the latter to pass freely therethrough. (See Fig. 10.) Adjustments for different lengths of strips can readily be secured by shifting the several knives upon the bed and by the adjustment or substitution of different sizes of gearing on the longitudinal shaft L.

In this our invention we do not wish to be limited to the exact details of construction shown, since they can readily be changed without departing from the principles of our invention.

Having thus described our invention, what we claim, and desire to secure by Letters Patent, is—

1. In a pasteboard-bandbox machine, the combination with a drum and mechanism for forming a box thereon, of feed-rolls for taking the pasteboard and paper covering from their reels, means for converting said pasteboard into lengths, means for gluing said paper covering, means for converting said covering into lengths greater than that of the pasteboard, and attaching said strips thereto, substantially as described.

2. In a bandbox-machine, the combination with a drum and mechanism for forming a box thereon, of feed-rolls for taking the paper covering and pasteboard from their reels, means for cutting said pasteboard into lengths, mechanism for preparing and attaching a paper covering to said pasteboard lengths, which covering is of greater width and breadth than said pasteboard length to which it is attached, means for gluing the under end and edge of the prepared strip, substantially as described.

3. The combination with the forming-drum, of the rock-shaft M, pivoted arms $n$ hinged to said shaft, and bearing a following roll, a weighted arm secured to the shaft for retaining said roll upon the drum, a yieldable connection between the shaft and the arms of the roll, a lever $s$ secured to the shaft and bearing crimping-rolls, means whereby said shaft is actuated, substantially as described.

4. The combination with the forming-drum, of the rock-shaft M, arms $n$ hinged to said shaft, and bearing a following roll, a weighted arm $i$ secured to said shaft for retaining said roll upon the drum, a rotary cam $l$ having connections with said arm $i$ whereby the latter is operated, a yieldable connection between the shaft and the arms of the roll, whereby the latter is yieldably retained upon the drum, substantially as described.

5. In a pasteboard-bandbox machine, the combination with the forming-drum and means for clamping the end of a strip thereon, of feed-rolls for taking the pasteboard from the rolls, a knife for severing the same, means for feeding the paper upon and gluing it to the pasteboard, knives for severing said paper in proper lengths, substantially as described.

6. In a machine for automatically making bandboxes, the combination of a drum provided with mechanism for clamping the end of a pasteboard and paper strip, feed-rolls for taking the pasteboard and paper from their reels, a glue-roll for gluing the under side of the paper, a knife for cutting the pasteboard into lengths, rolls I' for compressing said lengths to the glued paper covering, a knife $r'$ for severing the paper strip, and means for gluing the under end and edge thereof.

7. In a machine of the class described, the combination with the knives J' and $r'$, of the shafts $h'$ and $t'$ bearing cams to operate said knives, rock-shaft $i'$ connected with the shafts aforesaid, lever $l'$ connected with the said rock-shaft, means for operating said lever for the purpose of manipulating the knives aforesaid, substantially as described.

8. In a pasteboard-bandbox machine, the combination of the pasteboard feed-rolls, a knife adjacent thereto to cut the pasteboard into lengths, a gluing device for applying the glue for a paper covering, means for feeding the covering from its roll and gluing the same to the several pasteboard lengths, a final severing-knife for cutting the covering the desired length, a glue-roll and means for gluing the under edge and end of the completed strip.

9. The combination with the forming-drum, of a clamping device therein, a spring-actuated trip-lever upon the outside of the drum and connected with the said clamping device, an arm pivoted to the frame and bearing a lug to engage said trip-lever, a cam $f$ secured to a driven shaft and adapted to manipulate the arm, whereby the latter in turn operates the clamping device, substantially as described.

Signed at Danbury, county of Fairfield, State of Connecticut, this 31st day of October, A. D. 1895.

LEE THOMAS HALLOCK.
IRA PARKER HALLOCK.

Witnesses:
HENRY CROFUT,
JAMES B. WILDMAN.